United States Patent

[11] 3,580,157

[72] Inventor Oran T. Casebeer
 Interlaken, N.Y.
[21] Appl. No. 805,174
[22] Filed Mar. 7, 1969
[45] Patented May 25, 1971
[73] Assignee Eastman Kodak Company
 Rochester, N.Y.

[54] AUTOMATIC EXPOSURE CONTROL DEVICE
 13 Claims, 1 Drawing Fig.
[52] U.S. Cl. ........................................... 95/64,
 95/10, 250/229, 318/18, 318/130, 335/222,
 352/141
[51] Int. Cl. ........................................... G03b 9/04,
 G03b 19/18, G05b 6/02
[50] Field of Search........................................... 95/10 (C),
 64, 64 (D); 352/141; 250/204, 206, 210, 214, 215,
 229; 318/18, 21, 20.290, 20.605, 130;
 335/219—222

[56] References Cited
 UNITED STATES PATENTS
| | | | |
|---|---|---|---|
| 2,655,848 | 10/1953 | Gray, Jr. .................... | 95/64 |
| 2,885,471 | 5/1959 | King ........................... | 95/64X |
| 3,313,224 | 4/1967 | Biedermann ............... | 95/64 |
| 3,324,777 | 6/1967 | Kanner ....................... | 95/10(C) |
| 3,426,662 | 2/1969 | Sevin .......................... | 250/210X |

*Primary Examiner*—Samuel S. Matthews
*Assistant Examiner*—Joseph F. Peters, Jr.
*Attorneys*—R. W. Hampton and Daniel E. Sragow

ABSTRACT: An automatic exposure control device for photographic cameras includes a photocell-controlled multivibrator for varying a diaphragm aperture between minimum light passage and maximum light passage positions. Separate means are provided for automatic positive drive of the diaphragm to its minimum light passage position when the camera is stopped.

PATENTED MAY 25 1971 3,580,157
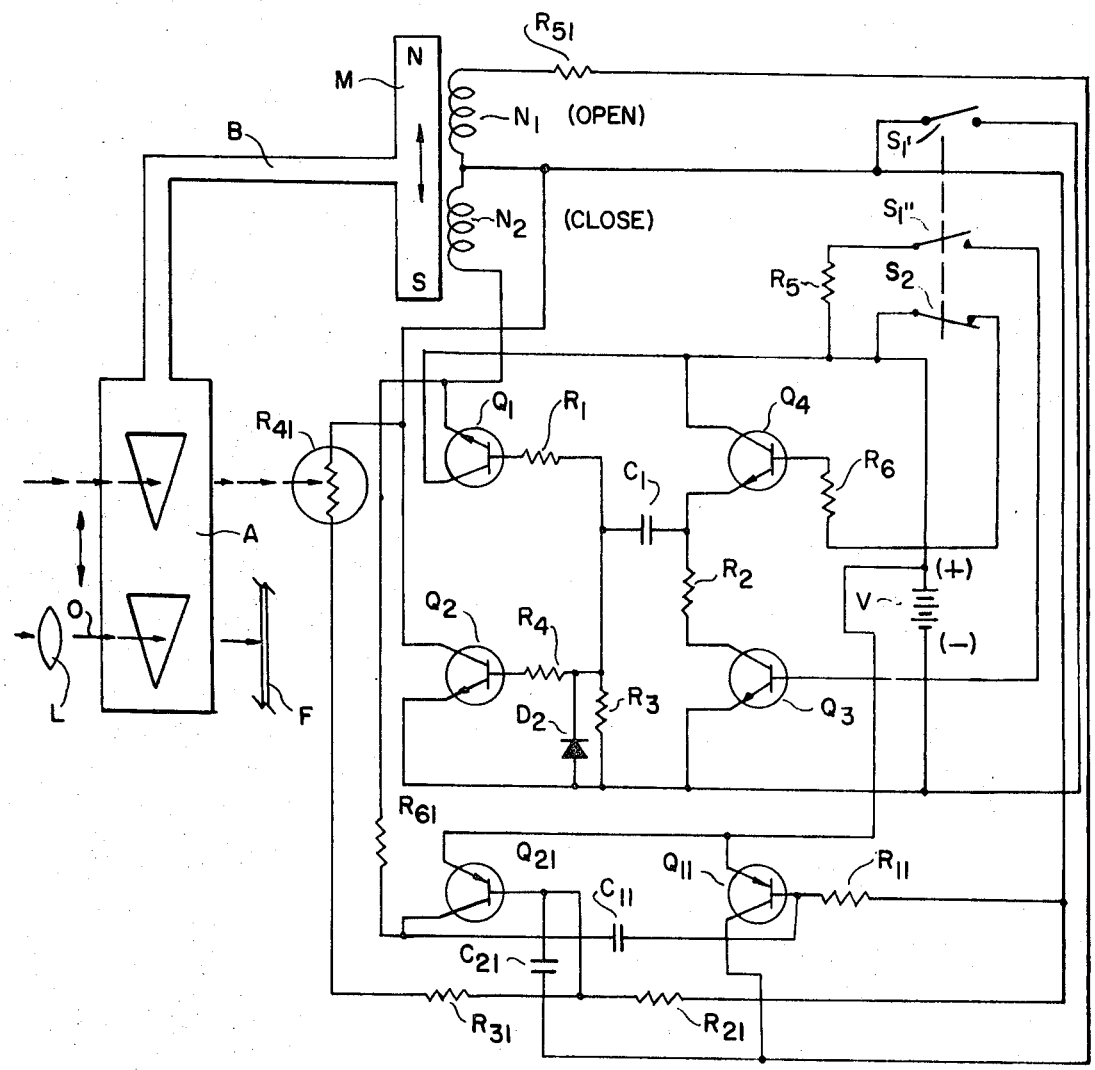
ORAN T. CASEBEER
INVENTOR.
BY Daniel E. Dragon
Robert W. Hampton
ATTORNEYS

AUTOMATIC EXPOSURE CONTROL DEVICE

CROSS-REFERENCES TO RELATED APPLICATIONS

Reference is hereby made to U.S. Pat. No. 3,427,941, issued Feb. 18, 1969 in the name of Lenard M. Metzger, entitled "Automatic Exposure Control."

BACKGROUND OF THE INVENTION

1. Field of the Invention

My invention relates to an automatic exposure control arrangement for photographic cameras, and more particularly to such control arrangement of the "null" type in which apertures masking to a variable degree both a photocell and the camera's taking lens are simultaneously varied as a function of scene brightness. 2. Description of the Prior Art It has become fairly common practice in the trade to provide in conjunction with photographic cameras, both "still" and "movie," various types of arrangements for automatic exposure control. These arrangements function in one manner or another to automatically control the exposure of the film by adjusting an aperture in accord with the ambient, or scene brightness. It is obvious that properly operating automatic exposure controls are valuable and desirable items to camera users, amateur and professional alike, since their use results in improved pictures and also relieves the user of a precise action previously necessary on his part.

Various different types of automatic exposure control devices have been proposed in the past, many of which have proven unsatisfactory in part for one reason or another. One general type of control device which has been proposed is the so-called "null" type wherein a servomechanism simultaneously controls diaphragm apertures which mask to a varying degree both a photocell and the camera's exposure aperture. The system is so arranged that the diaphragms are most fully open when the photocell is exposed to the minimum intensity of light required for acceptable exposed pictures. When the light intensity increases, the diaphragms masking both the photocell and the film are simultaneously moved toward "closed" position until the ambient light reaching the photocell is reduced to the calibrated level; i.e., the level for acceptable film exposure.

A null-type exposure control of the above general arrangement, but which embodies certain advantages over such arrangements of the prior art, is disclosed in the above-referenced U.S. Pat. No. 3,427,941 issued Feb. 18, 1969, to Lenard M. Metzger. In accordance with the Metzger arrangement, current pulses from a multivibrator, or other suitable source, drive the exposure adjusting means through a transducer which includes two oppositely poled coils fed, respectively, by the two sides of the multivibrator. The multivibrator, in turn, is controlled in its operation by the photocell in accord with the intensity of the scene light supplied thereto.

While certain of the prior art devices have operated in an entirely satisfactory manner within the confines of the features provided, and this is true particularly of the arrangement just referred to above, they have all lacked a satisfactory automatically operating means for assuring that the diaphragms be closed to their minimum when the camera is shut down, so as to insure against light leakage through the shutter.

SUMMARY OF THE INVENTION

Accordingly, it is an object of my invention to improve and enhance the operation of automatic exposure arrangements.

A more specific object of my invention is to more positively prevent the access of light to a camera film after the camera has been shut down or stopped.

A still more specific object of my invention is to assure the maximum closure of the light apertures of the exposure control when the camera is not operating.

These objects are accomplished according to this invention by an automatic exposure control device for a photographic camera of the type including an aperture regulating means for controlling the light reaching a film plane which comprises first and second oppositely poled coils for driving said regulating means in respectively opposite directions between maximum and minimum light transmission positions, means for alternately energizing said coils, and separate means for rendering said second coil effective independently of said first coil to drive said regulating means to minimum light transmitting position.

In accordance with the preferred embodiment of this invention, transistor means are included in an automatic exposure control means which are effective, when activated, to drive the "close" coil of the transducer to positively move the diaphragm aperture to its maximum closed position. Preferably, the transistor activation is controlled by operation of first and second switches. Opening the second switch with simultaneous closure of the first switch will result in normal operation of the exposure control means while the additional closing means remains inactive. On the other hand, opening of the first switch with simultaneous closure of the second switch will result in activation of the transistor means whereby to drive the "close" coil and assure maximum closing of the diaphragm aperture. The two switches may be coupled by suitable linkage and both operated by the shutter release switch provided on the camera.

BRIEF DESCRIPTION OF THE DRAWING

A full understanding of the arrangement contemplated by my invention as well as an appreciation of the various advantageous features may be gained from consideration of the following detailed description in connection with the accompanying drawing in which:

The single FIGURE shows schematically the arrangement contemplated by a specific illustrative embodiment of my invention wherein an automatic exposure means includes a separate positive drive for the "close" coil.

DETAILED DESCRIPTION OF THE INVENTION

Referring now to the drawing, the separate drive means which is the particular subject of my invention is shown as used in conjunction with an automatic exposure control arrangement of the general type disclosed and claimed in the copending application of Lenard M. Metzger, referred to above.

As fully described in the above application, the exposure control arrangement itself includes diaphragm aperture means, shown here as an aperture plate A having two apertures of similarly varying dimensions therein, which apertures control by their adjusted position the amount of ambient or scene light supplied to photocell R41 and simultaneously to the camera film F by lens L along axis O. The movement of plate A in the directions indicated by the double arrow is controlled by movement of permanent magnet M coupled to plate A by shaft B. Oppositely poled coils N1 "open" and N2 "close" in turn control the movement of magnet M.

Transistors Q11 and Q21 are connected in circuit in relation to each other and associated resistors and capacitances in a manner fully described in the prior art whereby to comprise an astable (free running) multivibrator. In the usual manner respective resistors R11 and R21 are connected between the bases of the respective transistors and the negative terminal of battery V, while in series with the base of each transistor are, respectively, capacitance C11, resistor R61 and coil N2, (transistor Q11) and capacitance C21, resistor R51 and coil N1 (transistor Q21). The collector of transistor Q11 is connected between the junction of capacitance C21 and resistor 51 while the collector of transistor Q21 is connected between the junction of capacitance C11 and resistor R61.

Photocell R41 is connected in parallel with resistor 21; as the resistance value of photocell R41 tends to be low at high illumination values, a resistor R31 is connected in series therewith whereby to raise the maximum effective resistance of the photocell.

In accord with multivibrator operation, when transistor Q11 is on, transistor Q21 is off, and vice versa. The current pulses from transistor Q11 are fed to coil N1 and the current pulses from transistor Q21 are fed to coil N2. In operation, therefore, there are alternate pulses passing through the two coils. The duration of the respective "OFF" and "ON" periods of the two transistors Q11 and Q21 is determined by the assigned characteristics of the respectively associated resistors and capacitances in the manner well described in the multivibrator prior art and as described, for example, in the above-referred copending application; also involved in this control, of course, is the varying resistance of photocell R41.

The characteristics of the resistors and capacitances which are a part of the multivibrator are so established that when photocell R41 is illuminated by the amount of light for an acceptable photograph, the multivibrator supplies equal current pulses to each of the oppositely poled coils N1 and N2 and the two apertures are moved to their most fully open position. When more light from a brighter scene illuminates the photocell, its resistance falls thus decreasing the ON time of transistor Q11. Because of the resulting decrease in current through coil N1, magnet M moves aperture plate A toward coil N2 thereby decreasing the amount of light transmitted both to the photocell R41 and to film F. The magnet continues to move the aperture plate A until the light reaching photocell R41 has been reduced to the minimum value for which it was originally calibrated, thereby restoring the predetermined equal and opposite current pulses to coils N1 and N2 whereby to balance the transducer.

The portion of the circuit described in detail thus far is generally similar to that described and claimed in the above-referred copending application of Lenard M. Metzger. While the arrangement provides efficient means for automatic exposure control, it will be noted that no means is provided for assuring the complete closure of the apertures when the camera is shut down. The additional portion of the circuit provided particularly in accordance with my invention for this purpose will now be described.

Switch S1 has two sets of contracts, S1' and S1". Contacts S1' control energization of the exposure control while contacts S1" control the bias on the base transistor Q3.

Switches S1 and S2 operate together. For normal operation of the multivibrator exposure control switch S2 is open and switch S1 is closed. For activation of the novel closing means of the present invention, switch S1 is open and S2 is closed.

Assuming, therefore, that switch S2 is opened and switches S1'0 and S1" are simultaneously closed, the multivibrator operates in its normal manner as described above as biasing potential is connected to the gases of transistors Q11 and Q21 through switch S1'. Also, it should be noted that, when switches S1' and S1" are closed, transistor Q3 is turned on an biasing potential is applied to its base through the switch S1. Capacitance C1 is now discharged through resistor R2, the collector-emitter path of transistor Q3 and diode D2.

It will be assumed now for purposes of further description that switches S1' and S1" are opened, for example for shutting down the camera, and that this action is simultaneous with closure of switch S2. When switch S1 is opened and potential removed from the bases of transistors Q11 and Q21, the multivibrator action, of course, ceases. It will be noted that transistor Q3 turns off following opening of switch S1".

When switch S2 closes, transistor Q4 is turned on by the potential applied to its base through resistor R6. When transistor Q4 turns on, transistors Q1 and Q2 are turned on by the potential applied to the base of transistor Q2 through the collector-emitter circuit of transistor Q4, capacitance C1 and resistors R1 and R4.

A path is now closed, therefore, for applying driving current to coil N2 "close," the path being from positive side of battery V, collector-emitter path of transistor Q1, through coil N2, collector-emitter path of transistor Q2, to negative side of battery V. This flow of current through the "close" coil N2 is effective to positively drive the aperture plate A to its maximum closed position wherein no light is passed to film F. (It will be noted that the path connecting the junction point of coils N1 and N2 to the negative terminal of battery V, which path is utilized in the multivibrator function, is now open at switch S1'.) Through a simple switch operation, therefore, which operation may well be incorporated in the "shutdown" operation for the camera, the same effect is automatically attained as has been previously attained only through separate use of a so-called "capping shutter."

When the path through transistor Q4 is closed, as described above, capacitance C1, of course, is gradually charged by the current passing through it; when the capacitance is fully charged both transistors Q1 and Q2 are turned off since the "-minus" (−) side of the capacitance is then at, or substantially at, ground potential. After capacitance C1 has reached its fully charged condition and transistors Q1 and Q2 have been turned off, there is no appreciable current flow in that portion of the circuit even though transistor Q4 remains on; the only possible current flow is that resulting from leakage current of capacitor C1 which, if it does in fact exist, is of no appreciable magnitude.

The characteristics of capacitance C1 are so determined that the period required for full charging is just sufficient to assure a driving action of "close" coil N2 of a duration necessary to assure that aperture plate A will be moved to its minimum light transmitting position. Thereafter, even though switch S2 remains closed and transistor Q4 is on, no current is supplied to the coils.

It will be obvious from the above description that my invention contemplates a valuable modification of a previously proposed automatic exposure control device; a modification through which by a simple switch operation, a "capping shutter" action is automatically attained. The required operation of switches S1' and S1", and S2 may well be attained, as pointed out above, by suitable linkage and, further, this linkage may well be driven by a shutter release button which controls the start and shut down of the camera. As set forth above, at the end of the full charging period of capacitance C1, the portion of the circuit which drives the "close" coil becomes and remains quiescent even though switch S2 is closed and transistor Q4 is on. When the camera is being started switch S2 is opened. Simultaneously switches S1' and S1" are closed. The multivibrator is started in its normal way and, at the same time, capacitance C1 is discharged preparatory to its required function when switch S2 is subsequently closed.

While a specific embodiment of the invention has been selected for detailed description, the invention is not, of course, limited in its application to the embodiment described. The embodiment which has been described should be taken as illustrative rather than restrictive thereof.

The invention has been described in detail with particular reference to preferred embodiments thereof, but it will be understood that variations and modifications can be effected within the spirit and scope of the invention.

I claim:

1. In an automatic exposure control apparatus for photographic cameras of the type including an exposure regulating means movable between maximum and minimum light transmission positions to control the amount of scene light reaching a film plane, first and second oppositely poled coils for driving said regulating means in respectively opposite directions, and means for selectively energizing said coils to adjust the position of said regulating means, the improvement comprising separate means for energizing said second coil to drive said regulating means to its minimum light transmitting position.

2. In an automatic exposure control apparatus, the improvement claimed in claim 1, further characterized by:
   a. said selective energizing means comprising a multivibrator electrically coupled to said coils and controlled by a photoresponsive element to drive said regulating means in accordance with the amount of light detected by the photoresponsive element;

b. first and second switch means, said first switch means being coupled to said multivibrator to control the activation thereof, said second switch means being coupled to said separate energizing means to control the activation thereof; and c. means coupling said switch means together for activating said multivibrator when said separate energizing means is deactivated and for deactivating said multivibrator when said separate energizing means is activated.

3. In an automatic exposure control apparatus, the improvement claimed in claim 1, wherein said separate energizing means comprises:

a. a pair of transistors each having base, emitter, and collector terminals;

b. means for connecting said second coil in series between the respective collector-emitter paths of said transistors; and c. means for rendering said transistors conductive.

4. In an automatic exposure control apparatus, the improvement claimed in claim 3, wherein said means for rendering said transistors conductive comprises:

a. a third transistor having base, collector, and emitter electrodes, the emitter-collector path of said third transistor being coupled to the respective bases of said pair of transistors so that said third transistor is adapted to supply bias potential to the base of said pair of transistors; and b. first switch means for selectively applying bias potential to the base of said third transistor.

5. In an automatic exposure control apparatus, the improvement claimed in claim 4 further comprising means effective upon conduction of said pair of transistors for automatically determining the time during which said transistors remain conductive.

6. In an automatic exposure control apparatus, the improvement claimed in claim 5 wherein said time determining means comprises a capacitance means and circuit means for charging said capacitance means, said capacitance means being connected with the bases of said pair of transistors.

7. In an automatic exposure control apparatus, the improvement claimed in claim 4, further comprising means for terminating the conduction of said pair of transistors at the end of a predetermined interval regardless of the conductive state of said third transistor.

8. In an automatic exposure control apparatus, the improvement claimed in claim 6, further comprising:

a. circuit means for discharging said capacitance; and b. means for closing said discharging circuit means when said selective energizing means is activated.

9. In an automatic exposure control apparatus, the improvement claimed in claim 8, wherein said closing means comprises:

a. a fourth transistor having base, collector, and emitter electrodes, the collector-emitter path of said fourth transistor being connected as a series element in said discharging circuit means;

b. second switch means for selectively applying bias potential to the base of said fourth transistor, said first and second switch means being coupled to alternately bias said third and fourth transistors, respectively; and c. means effective upon operation of said switches in one position for closing said last-mentioned bias applying means to turn on said fourth transistor.

10. In an automatic exposure control apparatus of the type including adjustable exposure aperture means movable between closed and open positions for controlling the amount of light transmitted to a film plane, transducer means having a close coil and an open coil of respectively opposite polarities for moving the exposure aperture means between its closed and open positions, and actuatable means for selectively energizing said coils, the improvement comprising:

a. separate means for energizing said close coil to move the exposure aperture means to its closed position when the means for selectively energizing said coils is deactuated; and b. means effective upon activation of said separate energizing means for determining the time interval during which said close coil is energized.

11. In an automatic exposure control apparatus, the improvement claimed in claim 10, wherein said time interval determining means comprises a capacitance network.

12. In an automatic exposure control apparatus, the improvement claimed in claim 11, further comprising means effective before activation of said time interval determining means for discharging said capacitance network.

13. In an automatic exposure control apparatus for photographic cameras of the type including an exposure regulating member movable between minimum and maximum light transmitting positions for controlling the amount of light transmitted to a film plane, electromechanical transducer means mechanically coupled with the exposure regulating member for moving the member between those positions, photoresponsive circuit means electrically connected to said transducer means for controlling the movement of the exposure regulating member in accordance with light received from a scene, and means for actuating the photoresponsive circuit means, the improvement comprising:

means for moving the exposure regulating member to its minimum light transmitting position when the photoresponsive circuit means has been deactuated.